F. MÜLLER.

ATTACHMENT FOR SCREW CUTTING MACHINES.

No. 10,576. Reissued Mar. 31, 1885.

WITNESSES

Fol. K. Rosenbaum.

Carl Klopp

INVENTOR

Friederich Müller

Goepel & Raegener

By his Attorneys

N. PETERS, Photo-Lithographer, Washington, D. C.

UNITED STATES PATENT OFFICE.

FRIEDERICH MÜLLER, OF ELIZABETH, NEW JERSEY.

ATTACHMENT FOR SCREW-CUTTING MACHINES.

SPECIFICATION forming part of Reissued Letters Patent No. 10,576, dated March 31, 1885.

Original No. 311,200, dated January 27, 1885. Application for reissue filed March 3, 1885.

*To all whom it may concern:*

Be it known that I, FRIEDERICH MÜLLER, of Elizabeth, in the county of Union and State of New Jersey, have invented certain new and useful Improvements in Attachments for Screw-Cutting Machines, of which the following is a specification.

This invention has reference to an improved knurling attachment for automatic screw-cutting machines of that class by which so-called "fancy screws," or screws with ornamental heads—such as are used for sewing-machines and similar purposes—are made. In the machines heretofore in use for this purpose the screws are cut from a continuous rod of the required thickness, first by reducing the shank of the screw to the required thickness, then threading the shank of the screw, then shaping the head, next knurling the circumference of the enlarged portion of the head, and finally cutting off the finished screw from the rod. The knurling of the head was heretofore accomplished by means of a knurling die or roller that was moved forward and pressed against the head of the screw, said die being then moved back again so as to be out of the way of the cutting-off tool, by which considerable time is lost.

The object of my invention is to so improve the automatic screw-cutting machines referred to that the knurling attachment is located intermediately between the head-shaping and cutting-off tools, and applied to the head of the screw by passing transversely across the same, whereby the construction of the screw-cutting machines is simplified and a greater number of screws finished in a given time.

The invention consists of a transversely-moving piece on which are supported a head-shaping tool and a cutting-off tool, and a knurling die or roller intermediately between said tools, said knurling-die being supported in horizontally and vertically adjustable bearings, and adapted to knurl the rim of the head of the screw while passing transversely past the same.

Figure 1:
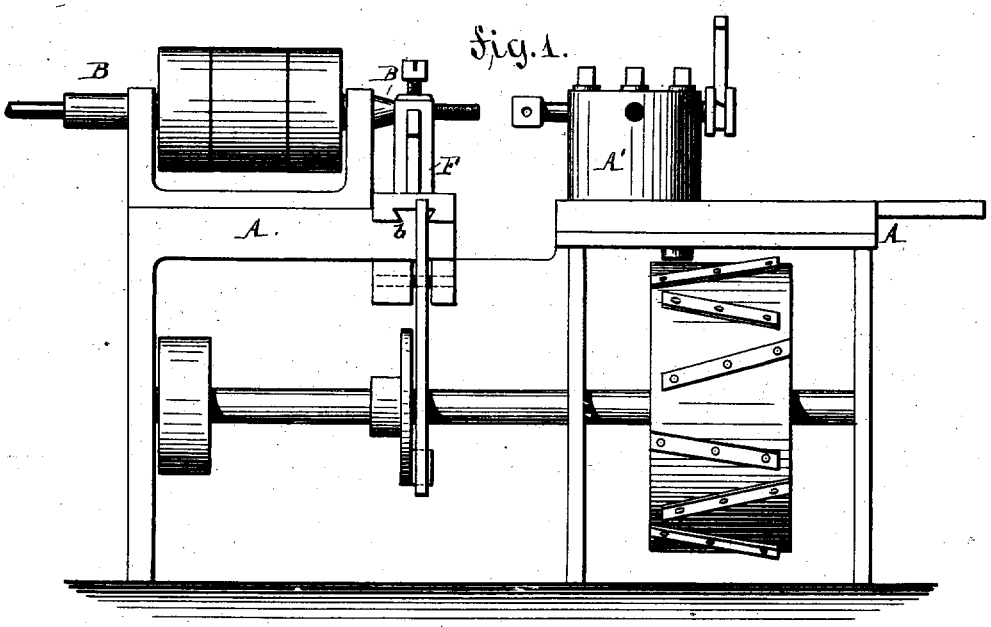
Figure 2:
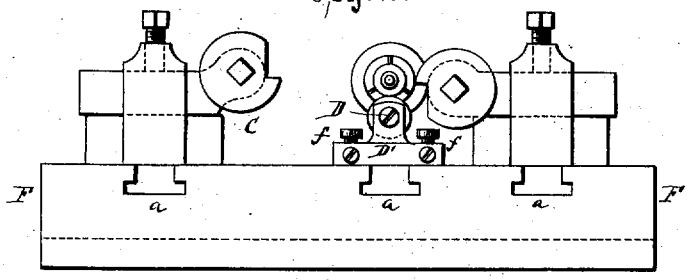
Figure 3:
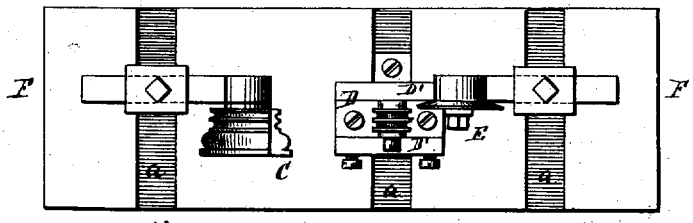
Figure 4:
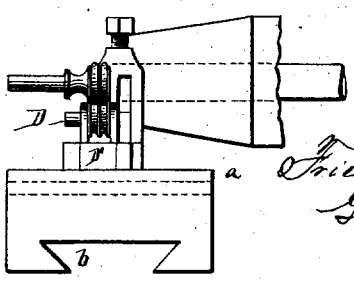

In the accompanying drawings, Figure 1 represents a side elevation of an automatic screw-cutting machine; and Figs. 2, 3, and 4 are respectively a side elevation, a plan, and an end view of the tool-supporting piece with my improved knurling attachment, said figures being drawn on a larger scale.

Similar letters of reference indicate corresponding parts.

A in the drawings represents the supporting-frame of an automatic screw-cutting machine. On the frame A is a revolving turret-head, A′, to which the reducing-tool and threading-chuck are fastened in the usual manner. After the wire is fed for the proper length through the hollow spindle B the reducing or shank-cutting tool cuts it to the proper size, after which the shank is threaded by the threading-chuck. As soon as the threading of the shank is completed the wire rod is acted upon successively by a shaping-tool, C, for forming the head of the screw, a die, D, for knurling the rim of the head, and a cutting-off tool, E, for severing the finished screw from the wire rod. The knurling-die D is arranged intermediately between the head-shaping and cutting-off tools, and immediately in front of the cutting-off tool. The tools C and E and knurling-die D are adjustably supported in transverse ways *a a* of the tool-supporting piece F, which is moved in ways *b* of the frame A transversely to the wire rod, and actuated in the usual manner in screw cutting machines. The knurling die or roller D is supported in bearings D′, which are guided in longitudinal ways of a base-piece, $D^2$, that is laterally adjustable in one of the transverse ways *a* of the tool-supporting piece F. The bearings D′ of the knurling-die D are vertically adjustable in the base-piece $D^2$ by set-screws *f f* and longitudinally by set-screws *f′ f′*, so that the knurling-die can be set accurately in horizontal and vertical direction to the shape and diameter of the screw-heads to be knurled, as shown in Figs. 2 and 3. The knurling attachment operates as follows: As soon as the threading of the shank has been completed by the chuck of the turret-head A′, the tool-supporting piece F is moved transversely to the rod from which the screws are cut. The head-shaping tool C is first applied, and imparts the desired shape to the head of the screw. The knurling-die D is next moved by the tool-supporting piece up to the rim of the head of the screw, and the same knurled simply by carrying the die past the revolving screw-head, which not only takes a comparatively small amount of power, but gives an absolutely certain result. As soon as the knurling operation is completed the tool-supporting piece F moves the cutter E against the wire rod, the cutter E cutting off the finished screw, which is then dropped into a suitable receiver. The tool-supporting piece F is then returned and moved forward again at the proper time, so that the operations just described are repeated, the wire rod having been first fed forward in the spindle B for the required distance.

The essential feature of my invention is that the knurling-die D is arranged in line with and on the same tool-supporting piece with the head-shaping and cutting tools C and E, so that the knurling-die is applied to and passed transversely to the heads of the screws during the forward motion of the tool-supporting piece F without requiring a special lateral motion for applying the knurling-die, as heretofore. In this manner the finishing of fancy screws, nuts, and other articles that require knurling can be quickly and automatically accomplished on the screw-cutting machines described.

I am aware that automatic screw-cutting machines in which the shaping-tools, parting-tool, and knurling-tool are placed on a revolving head supported on a cross-slide have been used heretofore. In this case the first tool to operate on the screw-head is the shaping-tool. When this has done its work, the slide moves back and revolves the head, bringing the second shaping-tool into the position before occupied by the first shaping-tool. The slide then moves forward and brings this tool in contact with the head of the screw, and when it has performed its operation the slide moves backward again, the head revolves, and brings the knurling-tool into the position formerly occupied by the shaping-tools. When in that position, the slide moves forward, bringing the knurling-tool into contact with the head of the screw, pressing against the center of the screw-head. When the knurling has been finished, the slide moves backward again and the head revolves, bringing the parting-tool into the position occupied by the shaping and knurling tools, after which the slide moves forward again and cuts of the finished head of the screw. These different operations consume considerable time, as they require eight movements of the cross-slide and four tools to perform the same amount of work that in my knurling attachment is performed by two movements of the tool-supporting piece and three tools. My knurling attachment requires no revolving head, and is considerably simpler than the knurling devices of the screw-cutting machines heretofore in use. The tools are placed on a tool-supporting piece, the knurling attachment passing entirely under the head of the screw, and not pressing on the side, whereby only two movements of the tool-supporting piece are required, and the construction of the machine considerably simplified.

Having thus described my invention, I claim as new and desire to secure by Letters Patent—

1. In an automatic screw-cutting machine, the combination, with a transversely-moving tool-supporting piece, of a head-shaping tool, a cutting-off tool, and a knurling die or roller that is supported on said transversely-moving piece intermediately between said tools, substantially as set forth.

2. In an automatic screw-cutting machine, the combination, with a transversely-moving tool-supporting piece, of a head-shaping tool, a cutting-off tool, and a knurling die or roller that is supported in horizontally and vertically adjustable bearings intermediately between said tools, substantially as set forth.

3. In an automatic screw-cutting machine, the combination, with a transversely-moving tool-supporting piece, of a cutting-off tool and a knurling die or roller supported on said transversely-moving piece in front of the cutting-off tool, substantially as set forth.

In testimony that I claim the foregoing as my invention I have signed my name in the presence of two witnesses.

FRIEDERICH MÜLLER.

Witnesses:

CARL KARP,
SIDNEY MANN.